No. 852,447. PATENTED MAY 7, 1907.
C. J. MELLIN.
RETURN CRANK FOR VALVE GEARS.
APPLICATION FILED DEC. 5, 1906.
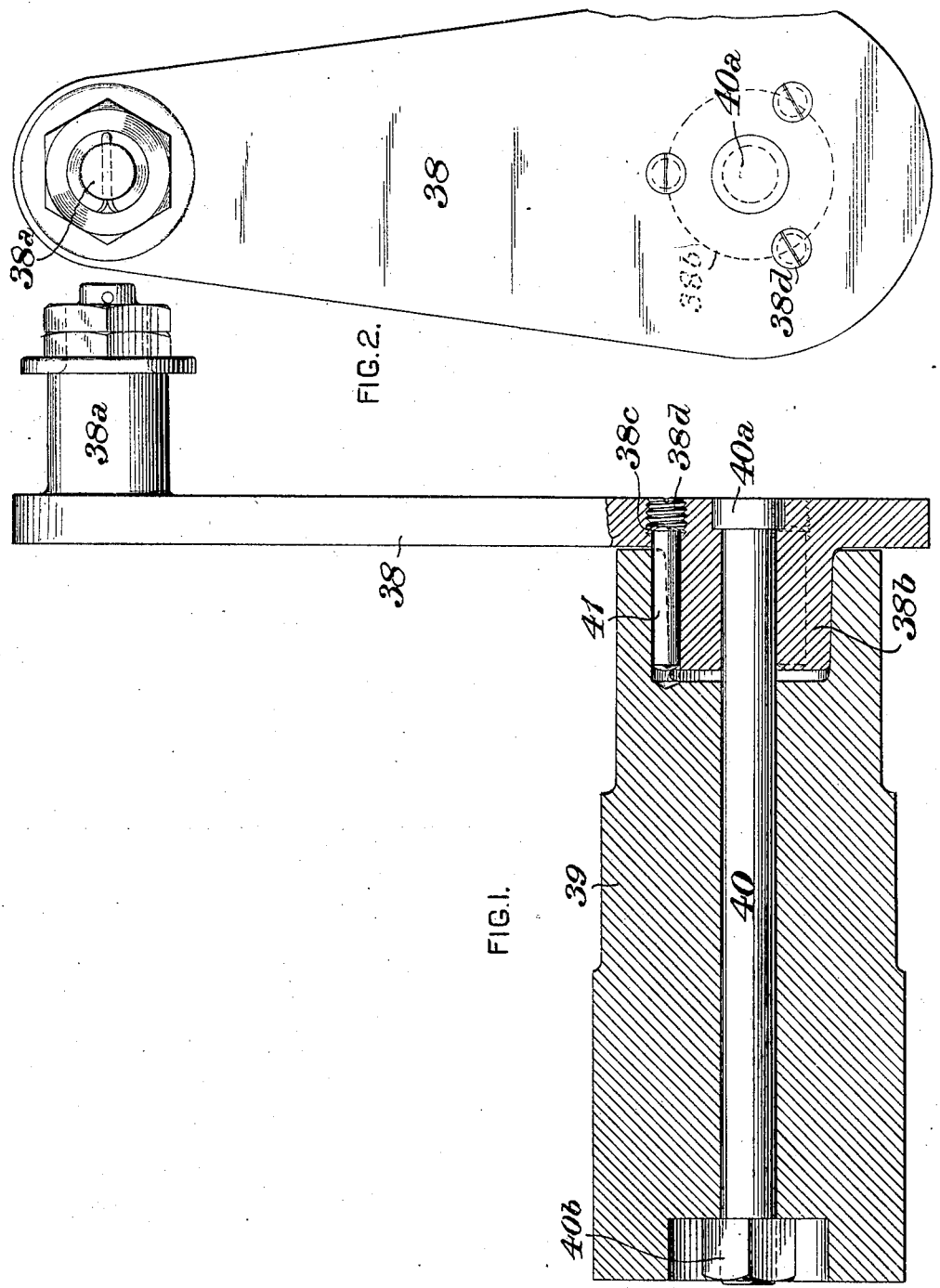

UNITED STATES PATENT OFFICE.

CARL J. MELLIN, OF SCHENECTADY, NEW YORK.

RETURN-CRANK FOR VALVE-GEARS.

No. 852,447.　　　　　Specification of Letters Patent.　　　　　Patented May 7, 1907.

Application filed December 5, 1906. Serial No. 346,444.

*To all whom it may concern:*

Be it known that I, CARL J. MELLIN, of Schenectady, in the county of Schenectady and State of New York, have invented a certain new and useful Improvement in Return-Cranks for Valve-Gears, of which improvement the following is a specification.

My invention more particularly relates to return or eccentric cranks which operate a moving member of a valve actuating mechanism, as the link of a Stephenson or a Walschaert valve gear, but is also applicable to return cranks used for other purposes, and its object is to provide simple and efficient means for connecting a return crank to a crank pin on which it is carried, in such manner that it shall be firmly held in position thereon during operation, with the capacity of being readily detached when desired.

The improvement claimed is hereinafter fully set forth.

In the accompanying drawings: Figure 1 is a side view, partly in elevation and partly in section, of a return crank and a longitudinal central section through a driving wheel crank pin to which it is connected, illustrating an application of my invention; and, Fig. 2, a front view, in elevation, of the return crank.

In the practice of my invention, I provide a return crank, 38, having a valve actuating crank pin, 38ª, formed upon, or secured to it in any known and preferred manner, and projecting from its outer side, adjacent to its outer or free end. A hub or boss, 38ᵇ, which is preferably, as shown, turned to a comparatively slight taper, is formed on the return crank, projecting from the inner side thereof adjacent to the end further from the crank pin, 38ª, said hub fitting truly in a corresponding central bore or socket at the outer end of the driving wheel crank pin, 39, by which the return crank is rotated, but without extending entirely to the bottom of the bore or socket, in order to enable the hub to be drawn to a tight fit therein.

The return crank is detachably secured to the driving wheel crank pin in the following manner. A clamping member, in the form of a bolt or stud, 40, having a head or nut, 40ª, which is preferably countersunk in the return crank, so as to be flush with the outer face thereof, or may project slightly therefrom, is passed freely through the hub, 28ᵇ, and driving wheel crank pin, 29, in line axially with said hub and pin, and is threaded at its rear end and provided with a nut, 40ᵇ, engaging its thread and abutting against a face at the bottom of a cylindrical recess, 39ª, at the inner end of the crank pin, 39. By screwing the nut, 40ᵇ, to a proper bearing, the hub, 38ᵇ, of the return crank, is clamped and firmly held in the bore of the opposite end of the crank pin, 39. If preferred, a pin or stud, secured centrally in the outer portion of the crank pin, and having a suitable head or nut, may be substituted for a pin extending through the latter as shown.

In order to effectually prevent movement of the return crank, relatively to the axis of the driving wheel crank pin, 39, the hub, 38ᵇ, of the return crank, is longitudinally recessed on its periphery to receive a cylindrical dowel, 41, or a plurality thereof, each dowel fitting in one of the recesses of the hub and in a corresponding recess in the crank pin, 39, which registers therewith. The cylindical bore or dowel socket, 38ᵈ, thus formed is extended through the return crank, and is threaded at and adjacent to its outer end, which may be closed by a screw cap, 38ᵈ, in the outer face of the return crank. A plurality of dowel sockets, spaced at equal distances apart, with a dowel fitting in each, is preferably provided, and it will be seen that by the engagement of the dowel or dowels with the hub of the return crank and the driving wheel crank pin, the former is effectively locked circumferentially in, and prevented from turning in, the latter. When it is desired to remove the return crank from the driving wheel crank pin, the nut, 40ᵇ, is detached from the clamping bolt, 40, or, if a stud is used as a clamping member, its outer nut is unscrewed, and by removing the caps from the dowel sockets and screwing a threaded rod thereinto, the dowels may be forced inwardly, so as to bear on the bottom of the bore in the driving shaft pin in which the hub of the return crank is fitted, and thereby release the hub from its tight fit in the socket and permit the return crank to be readily withdrawn from the driving shaft crank pin.

I claim as my invention and desire to secure by Letters Patent:

1. The combination of a crank pin having a bore or socket at its outer end, a return or eccentric crank having a hub or boss inclosed by said socket, and a clamping member extending through the hub of the return crank and engaging with the crank pin.

2. The combination of a crank pin having a bore or socket at its outer end, a return or eccentric crank having a hub or boss fitting in said socket, a clamping member extending through the hub of the return crank and engaging with the crank pin, and a dowel fitting longitudinally in the periphery of the hub and in an opposite longitudinal recess in the crank pin.

3. The combination of a crank pin having a longitudinally recessed bore or socket at its outer end, a return or eccentric crank having a hub or boss fitting in said socket, and also having a dowel socket recessed longitudinally in the periphery of its hub and extending through its body, at and near the outer face of which it is internally threaded, a clamping member extending through the hub of the return crank and engaging with the crank pin, and a dowel fitting in the dowel socket and in the adjoining longitudinal recess of the crank pin and thereby engaging with the crank pin and return crank.

4. The combination of a crank pin having a central bore or socket at its outer end, a return or eccentric crank having a hub or boss fitting in said socket, a clamping bolt extending centrally through the hub of the return crank into the crank pin, and having a screw thread for drawing the hub longitudinally to a tight bearing in the socket, and a dowel fitting longitudinally in the periphery of the hub and in an opposite longitudinal recess in the crank pin.

CARL J. MELLIN.

Witnesses:
J. SNOWDEN BELL,
GEORGE H. SONNEBORN.